United States Patent [19]

Winters

[11] 4,160,542

[45] Jul. 10, 1979

[54] POST AND RAIL INTERCONNECTION

[76] Inventor: Donald R. Winters, 1810 S. 11th St., Yakima, Wash. 98903

[21] Appl. No.: 912,062

[22] Filed: Jun. 2, 1978

[51] Int. Cl.² .......................................... E04H 17/06
[52] U.S. Cl. .................................... 256/70; 403/237; 403/245
[58] Field of Search ....................... 256/35, 36, 59, 65, 256/70, DIG. 5; 248/73, 218.4, 219.4, 221.3, 221.1, 221.4, 220.1, 220.2; 403/49, 230, 239, 237, 245, 246

[56] References Cited

U.S. PATENT DOCUMENTS

| 1,056,576 | 3/1913 | Olson | 256/35 |
| 1,208,361 | 12/1916 | Olson | 256/35 |
| 3,833,201 | 9/1974 | Dill | 256/35 |
| 3,972,639 | 8/1976 | Lening | 256/59 X |

FOREIGN PATENT DOCUMENTS 260368 10/1964 Australia .................................... 256/59

Primary Examiner—Werner H. Schroeder
Attorney, Agent, or Firm—Cole, Jensen & Puntigam

[57] ABSTRACT

A simple, yet secure connection between a vertical upright, such as a fence post, and a horizontal rail. The rail has secured thereto at either end, a collar of a material having memory and having a pair of spaced, vertically extending ears, with radially outwardly extending ends, adapted to pass through and expand against the internal surfaces of an outwardly extending, generally horizontal, closed loop. If necessary, a wedge or keeper may be driven between the ears once they are in place, thus preventing removal of the rail.

7 Claims, 4 Drawing Figures

POST AND RAIL INTERCONNECTION

BACKGROUND OF THE INVENTION

The present invention is directed to a means of securing a horizontal rail or the like to a vertical upright and in particular, is directed to the field of fencing but easily adapted to scaffolding, shelving or the like. Within the field of fencing, the invention may be adapted to either rail or chainlink fencing but could equally well be utilized in any fencing requiring metal uprights and rails. The cost of fencing an area, like the cost of many other things, has greatly increased. Although a portion of the increase must certainly be attributed to the increased cost of materials, without a doubt the major increase is because of the increased cost of labor and the compounding factor of the decreasing efficiency of those people hired to do laboring tasks. There must, of necessity, be a rigid connection between the upright and the rail in a fence, fence framework or shelf support. The connections in the past have been made by welding, nuts and bolts, threaded connectors or other fasteners. These fastening means, while resulting in an adequate structure, require both a greater degree of precision in the relative placement of the elements and a substantial amount of time for effecting the interconnection.

It is, therefore, an object of the present invention to provide an interconnection between the upright and a rail for a fence system or the like wherein the rail may be quickly and easily installed and yet will be rigid, accurately and permanently positioned.

It is another object of the present invention to provide an interconnection between an upright post and a rail wherein the means for interconnection may be fabricated in a factory using mass production techniques and wherein the actual installation requires a minimum amount of time.

It is still another object of the present invention to provide an interconnection between an upright and a rail wherein the interconnection is readily adaptable to different size uprights and/or different size rails without a corresponding change in the installation process.

It is yet another object of the present invention to provide an interconnection between an upright and a rail wherein the interconnection is rigid and secure without the requirement of sophisticated tools or elaborate structure.

Still a further object of the present invention is to provide a means for interconnecting a rail to an upright wherein the size of the rail may be changed without requiring a corresponding change in the interconnecting means.

Another object of the present invention is to provide an interconnection between an upright and a rail wherein the rail may be quickly and easily placed securely in position and will remain in position during further fabrication even prior to final securement.

DETAILED DESCRIPTION OF DRAWINGS

Figure 1:
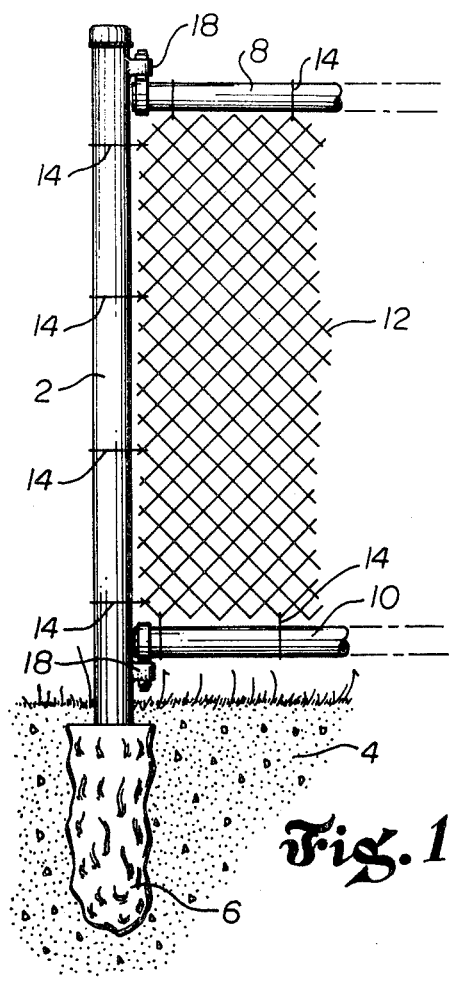
FIG. 1 is an elevational view of a cyclone type fence utilizing the present invention showing the upright and the rails in position and interconnected utilizing the present invention.

The present invention is directed to a unique method of securing horizontal rails or the like to an upright. This technique is well utilized in the construction of cyclone fences, rail fences, scaffolding, shelf supports or the like. As seen in FIG. 1, the invention is illustrated in use with a cyclone type fence and as seen, the metal upright 2 is secured in the supporting ground 4 by means of a cement base 6 or the like, assuring vertical stability. The invention is also useful, however, in applications where the upright is free standing. A pair of rails 8 and 10 are secured to the upright and an interwoven metallic fence 12 is secured to both the upright and the rails by means of attaching wires 14. The fencing or the attachment thereof are neither the subject of the present invention and therefore will not be discussed further in this application.

Figure 2:
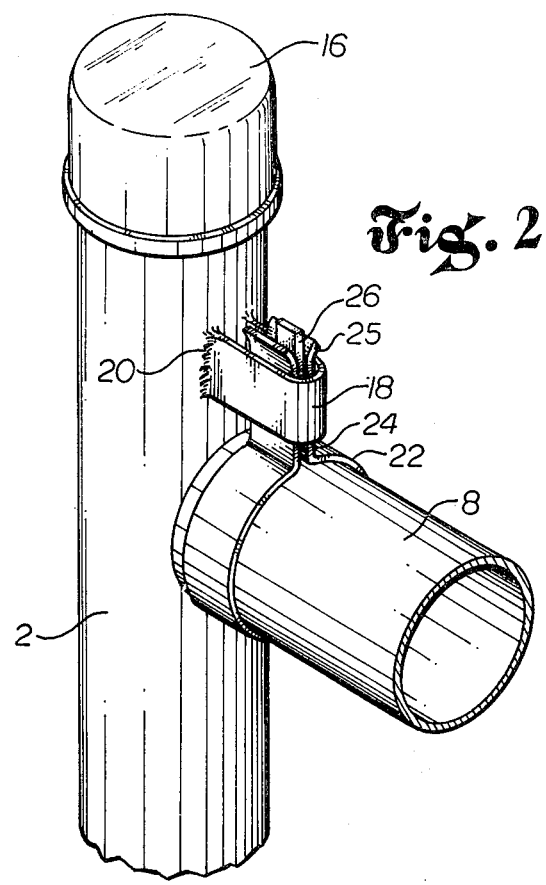
FIG. 2 is an isometric view showing in greater detail the interconnection between the upright and a rail.

As seen in FIG. 2, the upper portion of the upright 2, which is depicted as a hollow metal pipe is closed by means of cap member 16 to prevent a collection of litter and from being an attractive nuisance. A loop member 18 extends in a generally radially direction outwardly from the side of the upright 2 and is positioned at a desired location along the upright for the attachment of a rail. The loop member is formed by a band element welded to the upright 2 as at 20 and has its opening extending generally parallel to the axis of the upright 2, i.e. in a vertical direction when the upright is in position.

The horizontal or rail element 8 has placed upon its outer end an encircling band member 22 which substantially conforms to the outer surface of the rail 8 and has spaced, radially outwardly extending ear members 24 formed on the ends of the band. When in position, the ears extend through the opening in the loop member 18 and flare outwardly over the opposite edges of loop member 18, securing the band member 22 within the loop 18. The band 22, when interacting with loop 18, secures the rail at the proper vertical position adjacent to and projecting perpendicularly from the upright. The particular configuration of the preferred embodiment of the ears is best seen with respect to FIG. 4 and will be discussed in greater detail hereinafter.

It is to be noted that for security purposes a wedge 26 may be forced between the ear members 24 thus assuring that they will remain in position within the loop member 18.

Figure 3:
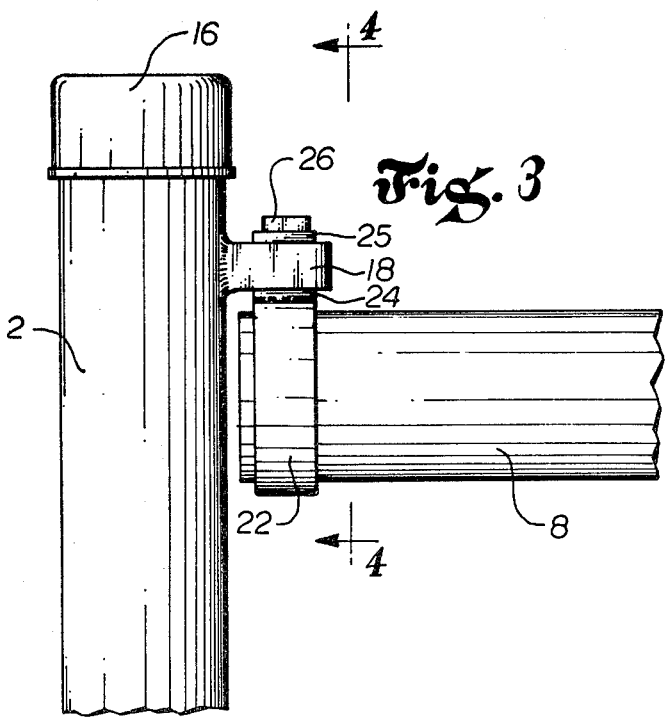
FIG. 3 is a side elevational view further depicting a relationship between the upright, a rail and the interconnection therebetween.

Referring now to FIG. 3, the relationship between the upright and the rail members 10 can readily be seen. It is to be noted in this view that the band member 22 is placed adjacent the end of the rail 8 and extends radially outwardly through the opening in the loop 18 to terminate in outwardly flared end elements 25 which interact with the loop 18. Band 22 is fabricated of material having memory such that once the ears extend through loop 18 they lock in position.

Figure 4:
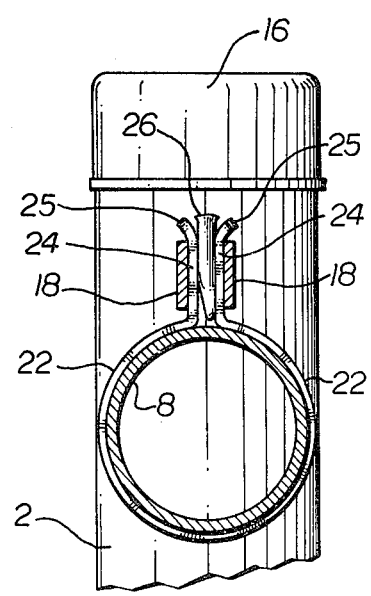
FIG. 4 is a view taken along lines 4—4 of FIG. 3.

The particular relationship between the loop 18 and the ears 24, in conjunction with the wedge 26, can probably best be seen in FIG. 4 wherein it is obvious that the wedge 26 prevents inward movement and thus removal of the ears from the loop 18.

The manufacturer of the fence, scaffold or the like need only provide a plurality of uprights in the required sizes having uniformly sized and shaped loops and a plurality of bands having differing radii to accomodate different size rails and interact with the loops secured to the uprights to satisfy essentially all requirements.

What is claimed is:

1. Means for securing a horizontal fencing member to an upright, comprising:

an outwardly extending, generally horizontal, loop member on the upright, wherein the opening in the loop member faces in a substantially vertical direction; and a collar member on the horizontal member, said collar member having first and second radially outwardly extending portions, said first and second portions being so spaced and of such a resilient material that they may be squeezed toward each other from a rest position and slipped through the opening loop in the loop member, where, upon rebound to their rest position, said first and second portions act to secure the horizontal member to the upright.

2. An article of claim 1, wherein said loop member is a band formed in the shape of a U which is substantially narrower than the cross-sectional dimension of the upright, wherein the free ends of said band are permanently secured to the upright.

3. An article of claim 2, wherein said band comprises a rigid material.

4. An article of claim 1, wherein said collar member is a band of material comprising first, second and third sections, wherein said first and second sections are said radially outwardly extending first and second portions which are located at the opposite ends of said band, and wherein said third section extends between said first and second sections and is configured to mate with the circumferential surface of the horizontal member.

5. An apparatus of claim 4, wherein said first and second sections each include, at the respective free ends thereof, a flared portion which is designed to catch on a corresponding edge of said loop member.

6. An apparatus of claim 5, wherein said third section is substantially circular and wherein said first and second sections are substantially straight and extend radially outwardly from said third section, leaving a relatively small open space between the ends of said third section and hence between said first and second sections as well.

7. An apparatus of claim 6, including a wedge-like keeper means configured and adapted to be inserted between said first and second sections of the band comprising said collar member, when said collar member is operatively positioned in said loop member, thereby forcing said first and second sections apart against said loop member and assisting in maintaining said collar member in said loop member.

* * * * *